United States Patent
Hayashi et al.

(10) Patent No.: US 10,717,053 B2
(45) Date of Patent: Jul. 21, 2020

(54) METHOD FOR PRODUCING LAMINATED COMPLEX, AND LAMINATED COMPLEX

(71) Applicant: SUMITOMO ELECTRIC FINE POLYMER, INC., Sennan-gun, Osaka (JP)

(72) Inventors: Fumihiro Hayashi, Osaka (JP); Yasuhiko Muroya, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 98 days.

(21) Appl. No.: 16/084,669

(22) PCT Filed: Mar. 7, 2017

(86) PCT No.: PCT/JP2017/009023
§ 371 (c)(1),
(2) Date: Sep. 13, 2018

(87) PCT Pub. No.: WO2017/159457
PCT Pub. Date: Sep. 21, 2017

(65) Prior Publication Data
US 2019/0083941 A1 Mar. 21, 2019

(30) Foreign Application Priority Data

Mar. 16, 2016 (JP) .................................. 2016-053065
Jun. 24, 2016 (JP) .................................. 2016-125417

(51) Int. Cl.
*B01D 69/12* (2006.01)
*B01D 71/36* (2006.01)
(Continued)

(52) U.S. Cl.
CPC .......... *B01D 69/12* (2013.01); *B01D 53/228* (2013.01); *B01D 67/0016* (2013.01);
(Continued)

(58) Field of Classification Search
CPC ........ B01D 69/12; B01D 71/32; B01D 71/36; B01D 67/0016; B01D 67/0083;
(Continued)

(56) References Cited

U.S. PATENT DOCUMENTS

2009/0301307 A1* 12/2009 Sugiyama ............ B01D 53/228
96/9

FOREIGN PATENT DOCUMENTS

JP H10-99665 A 4/1998
JP 2010-094579 A 4/2010
(Continued)

*Primary Examiner* — Taiwo Oladapo
(74) *Attorney, Agent, or Firm* — Faegre Drinker Biddle & Reath LLP

(57) ABSTRACT

A method for producing a laminated complex according to one embodiment of the present invention is a method for producing a laminated complex that includes a sheet-shaped or tube-shaped porous support and a semipermeable membrane layer stacked on an outer surface of the support, the method including a coating step of coating an outer surface of the support with a semipermeable membrane layer-forming composition in which a fluororesin is dispersed in a solvent; an immersing step of immersing the coated surface of the support in water after the coating step; and a heating step of heating water in which the support is immersed.

4 Claims, 2 Drawing Sheets

(51) Int. Cl.
*B01D 67/00* (2006.01)
*B01D 69/02* (2006.01)
*C08J 5/22* (2006.01)
*B01D 53/22* (2006.01)
*B01D 71/32* (2006.01)
*B01D 69/08* (2006.01)
*B01D 69/06* (2006.01)
*B01D 69/10* (2006.01)
*B01D 69/04* (2006.01)

(52) U.S. Cl.
CPC ......... *B01D 67/0083* (2013.01); *B01D 69/02* (2013.01); *B01D 71/32* (2013.01); *B01D 71/36* (2013.01); *C08J 5/2281* (2013.01); *B01D 69/04* (2013.01); *B01D 69/06* (2013.01); *B01D 69/08* (2013.01); *B01D 69/10* (2013.01); *B01D 2053/224* (2013.01); *B01D 2256/10* (2013.01); *B01D 2256/16* (2013.01); *B01D 2256/245* (2013.01); *B01D 2257/104* (2013.01); *B01D 2257/11* (2013.01); *B01D 2257/504* (2013.01); *B01D 2258/0283* (2013.01); *B01D 2258/05* (2013.01); *B01D 2323/08* (2013.01); *B01D 2325/02* (2013.01); *B01D 2325/20* (2013.01); *C08J 2327/12* (2013.01)

(58) Field of Classification Search
CPC ............... B01D 69/02; B01D 53/228; B01D 2258/0283; B01D 2258/05; B01D 2256/16; B01D 2257/504; B01D 2323/08; B01D 69/10; B01D 2257/104; B01D 69/04; B01D 2256/245; B01D 2256/10; B01D 2257/11; B01D 69/08; B01D 69/06; B01D 2053/224; B01D 2325/02; B01D 2325/20; C08J 5/2281; C08J 2327/12

See application file for complete search history.

(56) References Cited

FOREIGN PATENT DOCUMENTS

KR      2003086741 A    *   11/2003
WO    WO-2007/125944 A1    11/2007

* cited by examiner

METHOD FOR PRODUCING LAMINATED COMPLEX, AND LAMINATED COMPLEX

TECHNICAL FIELD

The present invention relates to a method for producing a laminated complex, and to a laminated complex. The present application claims priority to Japanese Patent Application No. 2016-053065 filed Mar. 16, 2016, and Japanese Patent Application No. 2016-125417 filed Jun. 24, 2016, the entire contents of which are incorporated herein by reference.

BACKGROUND ART

Porous separation membranes that take a form of a hollow fiber or a flat membrane are used as semipermeable membranes for removing fine particles. The porous separation membranes utilize selective permeability of semipermeable membranes, and a substance is filtered and separated therethrough to remove fine particles that cannot pass through the semipermeable membranes. Since the diffusing rate of a substance that passes through a semipermeable membrane is low, a porous separation membrane is required to have a small thickness; however, thin separation membranes are prone to breaking.

A semipermeable membrane, which has been made porous by stretching a fluororesin thin membrane fixed onto a support, has been proposed as a porous separation membrane that has a small thickness and is less prone to breaking (refer to Japanese Unexamined Patent Application Publication No. 2010-94579). This porous separation membrane is formed by stretching a resin coating, which is stacked on a stretchable support, at a temperature lower than 30° C. so as to suppress occurrence of breaking of the separation membrane.

According to the porous separation membrane of the related art described above, the fluororesin thin membrane that functions as a semipermeable membrane is produced by applying a fluororesin dispersion, drying the applied fluororesin dispersion, and sintering the dried fluororesin dispersion. Moreover, the semipermeable membrane that can be produced by this method has an average thickness of less than 20 μm and a pore size of 45 nm or less.

CITATION LIST

Patent Literature

PTL 1: Japanese Unexamined Patent Application Publication No. 2010-94579

SUMMARY OF INVENTION

A method for producing a laminated complex according to one embodiment of the present invention is a method for producing a laminated complex that includes a sheet-shaped or tube-shaped porous support and a semipermeable membrane layer stacked on an outer surface of the support, the method including a coating step of coating an outer surface of the support with a semipermeable membrane layer-forming composition in which a fluororesin is dispersed in a solvent; an immersing step of immersing the coated surface of the support in water after the coating step; and a heating step of heating water in which the support is immersed.

A laminated complex according to another embodiment of the present invention is a laminated complex used in separation of molecules or ions, the laminated complex including a sheet-shaped or tube-shaped porous support and a semipermeable membrane layer stacked on an outer surface of the support, in which the semipermeable membrane layer has an average penetration distance of 5 μm or less from the outer surface of the support.

DESCRIPTION OF EMBODIMENTS

Figure 1:
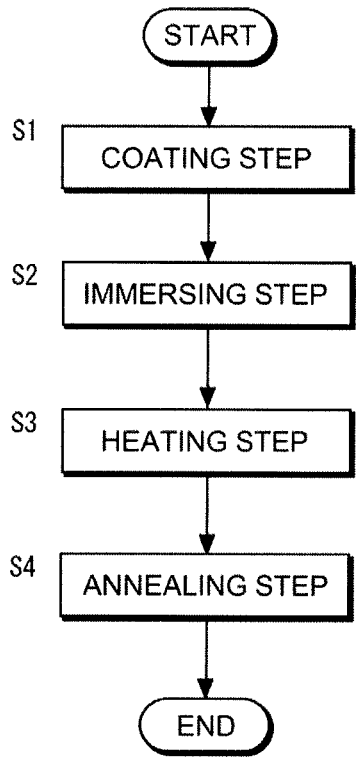
FIG. 1 is a flowchart indicating a method for producing a laminated complex according to one embodiment of the present invention.

Problem to be Solved by this Disclosure

When a porous separation membrane is used as a semipermeable membrane of a reverse osmosis membrane (RO membrane), an ion exchange membrane, or the like for use in separation of gases and ions, a semipermeable membrane having an average thickness of 10 μm or less and a pore size of less than 10 nm is required from the viewpoint of separation accuracy. However, if a semipermeable membrane having an average thickness of 10 μm or less and a pore size of less than 10 nm is produced by application of a dispersion as with the porous separation membrane of the related art described above, the obtained membrane does not have a sufficient strength. Thus, during production and after completion of the production, it is difficult to handle the thin fluororesin membrane not yet fixed to the support, and pin holes and cracks tend to be generated due to, for example, shrinking that occurs as the solvent vaporizes. When pin holes and the like are present in the semipermeable membrane formed by stretching a thin fluororesin membrane, leakage contamination occurs, and thus the porous separation membrane of the related art does not have sufficient separation accuracy for molecules or ions.

The present invention has been made under the circumstances described above, and an object thereof is to provide a method for producing a laminated complex, in which pin holes and cracks rarely occur even when a semipermeable membrane layer has an average thickness of 10 μm or less and a pore size of less than 10 nm, and to provide the laminated complex.

Description of the Embodiments of the Present Invention

A method for producing a laminated complex according to one embodiment of the present invention is a method for producing a laminated complex that includes a sheet-shaped or tube-shaped porous support and a semipermeable membrane layer stacked on an outer surface of the support, the method including a coating step of coating the outer surface of the support with a semipermeable membrane layer-forming composition in which a fluororesin is dispersed in a solvent; an immersing step of immersing the coated surface of the support in water after the coating step; and a heating step of heating water in which the support is immersed.

According to the method for producing a laminated complex, after the outer surface of the support is coated with a semipermeable membrane layer-forming composition in which a fluororesin is dispersed, water, in which the coated surface of the support is immersed, is heated to volatilize and remove the solvent so that water around the coated surface prevents penetration of the semipermeable membrane layer-forming composition into the support. Thus, a homogeneous semipermeable membrane layer fixed to the support can be obtained. Consequently, the method for producing a laminated complex can prevent generation of pin holes and cracks while controlling the semipermeable membrane layer to have an average thickness of 10 μm or less and a pore size of less than 10 nm.

Preferably, the method further includes an annealing step of annealing the laminated complex after the heating step. When the method further includes the step of annealing the laminated complex after the heating step, the density of the fluororesin is increased, the strength of the semipermeable membrane layer is improved, and the effect of suppressing generation of pin holes and cracks in the semipermeable membrane layer is enhanced.

The boiling point of the solvent is preferably 50° C. or higher and 150° C. or lower. When the boiling point of the solvent is within the above-described range, the solvent in the semipermeable membrane layer-forming composition can be vaporized by heating water and a semipermeable membrane layer can be formed in a relatively short time. Thus, penetration of the semipermeable membrane layer-forming composition into the support can be further suppressed, and thus the homogeneity of the semipermeable membrane layer is enhanced. Therefore, the effect of suppressing generation of pin holes and cracks in the semipermeable membrane layer can be enhanced.

The porosity of the support is preferably 30% or more and 90% or less. When the porosity of the support is within the above-described range, the solvent vaporization efficiency in the heating step can be increased.
Thus, penetration of the semipermeable membrane layer-forming composition into the support can be further suppressed, and thus the homogeneity of the semipermeable membrane layer is further enhanced. Therefore, the effect of suppressing generation of pin holes and cracks in the semipermeable membrane layer can be enhanced. Moreover, while the strength of the produced laminated complex is maintained, the diffusing rate of the substance passing therethrough can be increased.

A laminated complex according to another embodiment of the present invention is a laminated complex for use in separation of molecules or ions, the laminated complex including a sheet-shaped or tube-shaped porous support and a semipermeable membrane layer stacked on an outer surface of the support, in which the semipermeable membrane layer has an average penetration distance of 5 μm or less from the outer surface of the support.

In this laminated complex, the semipermeable membrane layer is directly stacked on the support; thus, the support and the semipermeable membrane layer are integrated, the strength of the semipermeable membrane layer is increased, and thus, handling during or after production is facilitated. Moreover, since the average penetration distance of the semipermeable membrane layer from the outer surface of the support is equal to or less than the upper limit described above, although the thickness of the semipermeable membrane layer is reduced, the proportion of the semipermeable membrane layer that lies outside the support relative to the entire semipermeable membrane layer is relatively large. As a result, the homogeneity of the semipermeable membrane layer can be maintained, and, thus, generation of pin holes and cracks in the semipermeable membrane layer can be suppressed even when the thickness of the semipermeable membrane layer is reduced. Consequently, in this laminated complex, the semipermeable membrane layer can have an average thickness of 10 μm or less and a pore size of less than 10 nm. Furthermore, since the support in the laminated complex is porous, the diffusing rate of the substance passing therethrough is rarely obstructed. Thus, the laminated complex is suitable for separating molecules or ions.

The semipermeable membrane layer preferably contains an amorphous fluororesin as a main component. When the main component of the semipermeable membrane layer is an amorphous fluororesin, the coating property of the semipermeable membrane layer for the support is improved, and pin holes and cracks in the semipermeable membrane layer can be reduced.

The Gurley number of the laminated complex is preferably 600 seconds or more. When the Gurley number of the laminated complex is equal to or larger than the lower limit described above, pin holes and cracks in the semipermeable membrane layer can be further reduced.

The laminated complex preferably selectively allows molecules having a kinetic diameter of less than 0.40 nm to permeate. Furthermore, the laminated complex preferably selectively allows helium, hydrogen, carbon dioxide, oxygen, nitrogen, or methane to permeate. The laminated complex can be appropriately used in various industrial usages by selectively allowing these gases to permeate.

Here, "porosity" means the ratio of the area occupied by pores in a section of a porous body taken in a desired direction. The "main component" means the component that is contained in the highest amount. For example, the main component is a component contained in an amount of 50 mass % or more. The "Gurley number" means the time required for 100 cm$^3$ of air to pass through a 6.45 cm$^2$ sample at an average pressure difference of 1.22 kPa as measured in accordance with JIS-P 8117 (2009). The "kinetic diameter" means a kinetic diameter derived from an expression of the Lennard-Jones potential. The "average penetration distance" means the average value of the distance in the depth direction from the outer surface of the support as the semipermeable membrane layer penetrates into pores in the support. The average penetration distance is calculated by observing a section of the laminated complex with a scanning electron microscope (SEM), and taking an average of values measured at 10 points.

Effects of the Present Disclosure

According to the method for producing a laminated complex, a laminated complex in which pin holes and cracks are rarely generated can be produced although the semipermeable membrane layer has an average thickness of 10 μm or less and a pore size of less than 10 nm. Moreover, the laminated complex is suitable for separating molecules or ions since pin holes and cracks are relatively few although the semipermeable membrane layer has an average thickness of 10 μm or less and a pore size of less than 10 nm.

Detailed Description of the Embodiments of the Present Invention

A method for producing a laminated complex and a laminated complex according to embodiments of the present invention will now be described in detail below.

[Method for Producing Laminated Complex]

The method for producing a laminated complex is a method for producing a laminated complex that includes a sheet-shaped or tube-shaped porous support and a semipermeable membrane layer stacked on an outer surface of the support. As illustrated in FIG. 1, the method for producing a laminated complex includes a coating step S1 of coating an outer surface of the support with a semipermeable membrane layer-forming composition in which a fluororesin is dispersed in a solvent; an immersing step S2 of immersing the coated surface of the support in water after the coating step S1; a heating step S3 of heating water in which the support is immersed; and an annealing step S4 of annealing the laminated complex after the heating step S3.

According to the method for producing a laminated complex, after the outer surface of the support is coated with a semipermeable membrane layer-forming composition in which a fluororesin is dispersed, water, in which the coated surface of the support is immersed, is heated to volatilize and remove the solvent so that water around the coated surface prevents penetration of the semipermeable membrane layer-forming composition into the support. Thus, a homogeneous semipermeable membrane layer fixed to the support can be obtained. Consequently, the method for producing a laminated complex can prevent generation of pin holes and cracks while controlling the semipermeable membrane layer to have an average thickness of 10 μm or less and a pore size of less than 10 nm.

<Coating Step>

In the coating step S1, the outer surface of the support is coated with the semipermeable membrane layer-forming composition in which a fluororesin is dispersed in a solvent.

(Semipermeable Membrane Layer-Forming Composition)

The fluororesin dispersed in the semipermeable membrane layer-forming composition takes a powder form (hereinafter, also referred to as "fluororesin powder"). Examples of the fluororesin include amorphous fluororesins, polytetrafluoroethylene (PTFE), and tetrafluoroethylene-perfluoroalkyl vinyl ether copolymer (PFA). Among these, amorphous fluororesins are preferable. When the fluororesin is an amorphous fluororesin, the coating property of the semipermeable membrane layer for the support is improved, and generation of pin holes and cracks in the semipermeable membrane layer can be reduced.

The lower limit of the number-average molecular weight of the fluororesin is preferably 50,000 and more preferably 100,000. Meanwhile, the upper limit of the number-average molecular weight of the fluororesin is preferably 2,000,000, more preferably 1,000,000, and most preferably 500,000. When the number-average molecular weight of the fluororesin is lower than the lower limit, intermolecular gaps increase in number and tend to become continuous in the thickness direction of the semipermeable membrane layer, and pin holes and cracks may be generated in the resulting semipermeable membrane layer. Conversely, when the number-average molecular weight of the fluororesin exceeds the upper limit, the porosity of the resulting semipermeable membrane layer may become insufficient. The "number-average molecular weight" is a value measured by gel filtration chromatography.

The lower limit of the fluororesin content in the semipermeable membrane layer-forming composition is preferably 5 mass % and more preferably 7 mass %. Meanwhile, the upper limit of the fluororesin content is preferably 20 mass % and more preferably 15 mass %. When the fluororesin content is less than the lower limit, it becomes difficult to evenly disperse the fluororesin powder at the time of coating with the semipermeable membrane layer-forming composition, and pin holes and cracks may be generated in the resulting semipermeable membrane layer. In contrast, when the fluororesin content exceeds the upper limit, it may become difficult to control the average thickness of the semipermeable membrane layer to be obtained on the nanometer order.

Examples of the solvent include solvents having relatively low boiling points, e.g., paraffins such as hexane, and fluorine-based oil such as perfluoropolyether (PFPE). The solvent may be incompatible with water. When the solvent is incompatible with water, penetration of the semipermeable membrane layer-forming composition into the support can be effectively suppressed. From this viewpoint, the solvent is preferably a fluorine-based oil having high fluororesin-powder-dissolving power and low compatibility with water.

The lower limit of the boiling point of the solvent is preferably 50° C. and more preferably 80° C. The upper limit of the boiling point of the solvent is preferably 150° C. and more preferably 120° C. When the boiling point of the solvent is lower than the lower limit, the solvent boils violently during heating in the heating step S3 described below, and thus pin holes and cracks may be generated in the resulting semipermeable membrane layer. In contrast, when the boiling point of the solvent exceeds the upper limit, it takes the solvent a longer time to vaporize during heating in the heating step S3, and thus the semipermeable membrane layer-forming composition may penetrate into the support.

The solvent preferably has high wettability to the support and a capacity to infiltrate into the support. Specifically, the solvent preferably has a surface tension equal to or lower than the critical surface tension of the material constituting the support described below. The upper limit of the surface tension of the solvent is preferably 20 dyne/cm and more preferably 18 dyne/cm. When the surface tension is equal to or lower than the critical surface tension of the material constituting the support, the solvent more easily passes through the support and can be vaporized from the surface opposite of the surface coated with the semipermeable membrane layer-forming composition during heating in the heating step S3 described below. Meanwhile, the lower limit of the surface tension of the solvent is not particularly limited, and is usually about 5 dyne/cm. The "surface tension" is a value measured by the ring method.

The surface tension of the solvent can be adjusted by, for example, selecting a fluorine-based solvent having a low surface tension or by using a surfactant. The surfactant used in adjustment is preferably an anionic surfactant, which decreases the coefficient of friction to the coating device and which has a high effect on suppressing generation of pin holes and cracks. Examples of the anionic surfactant include carboxylic acid-type surfactants such as a polyoxyethylene alkyl ether carboxylic acid ester salt, sulfuric acid ester-type surfactants such as a polyoxyethylene alkyl ether sulfonic acid ester salt, and phosphoric acid ester-type surfactants such as a polyoxyethylene alkyl ether phosphoric acid ester salt.

The lower limit of the anionic surfactant content in the semipermeable membrane layer-forming composition is preferably 0.5 mg/ml and more preferably 2.5 mg/ml. The upper limit of the anionic surfactant content is preferably 30 mg/ml and more preferably 10 mg/ml or less. When the anionic surfactant content is less than the lower limit, the effect of reducing the surface tension of the solvent may be insufficient. In contrast, when the anionic surfactant content exceeds the upper limit, the viscosity is excessively increased, and thus coagulation of the fluororesin powder readily occurs. Thus, it becomes difficult to evenly disperse the fluororesin powder in coating with the semipermeable membrane layer-forming composition, and pin holes and cracks may be generated in the resulting semipermeable membrane layer.

(Support)

The support is a sheet-shaped or tube-shaped porous body. The material for the support is not particularly limited, and examples thereof include various elastomers, polyolefins, and fluororesins. Among these, fluororesins, which have excellent chemical resistance and heat resistance, etc., are preferable, and PTFE is particularly preferable.

The lower limit of the average thickness of the support is preferably 50 μm and more preferably 100 μm. Meanwhile, the upper limit of the average thickness of the support is preferably 1000 μm and more preferably 500 When the average thickness of the support is less than the lower limit, the strength of the laminated complex produced becomes insufficient, and pin holes and cracks may be generated in the semipermeable membrane layer. Conversely, when the average thickness of the support exceeds the upper limit, the laminated complex produced becomes thick beyond what is necessary, and the handling property of the laminated complex may be degraded.

The lower limit of the average pore size of the support is preferably 0.01 μm and more preferably 0.1 μm. Meanwhile, the upper limit of the average pore size of the support is preferably 10 μm and more preferably 5 μm. When the average pore size of the support is less than the lower limit, it takes the solvent a longer time to vaporize during heating in the heating step S3, and thus the semipermeable membrane layer-forming composition may penetrate into the support. Moreover, due to the decrease in the diffusing rate of the substance passing therethrough, the laminated complex produced may perform insufficiently as a separation membrane. Conversely, when the average pore size of the support exceeds the upper limit, the strength of the laminated complex produced becomes insufficient, and pin holes and cracks may be generated in the semipermeable membrane layer. The "average pore size" refers to the average diameter of the pores in the outer surface and can be measured by using a pore diameter distribution measuring instrument (for example, a perm porometer "CFP-1200A" produced by PMI, compliant with ASTM F3t6).

The lower limit of the porosity of the support is preferably 30% and more preferably 50%. Meanwhile, the upper limit of the porosity of the support is preferably 90% and more preferably 85%. When the porosity of the support is less than the lower limit, it takes the solvent a longer time to vaporize during heating in the heating step S3, and thus the semipermeable membrane layer-forming composition may penetrate into the support. Moreover, due to the decrease in the diffusing rate of the substance passing therethrough, the laminated complex produced may perform insufficiently as a separation membrane. Conversely, when the porosity of the support exceeds the upper limit, the strength of the laminated complex produced becomes insufficient, and pin holes and cracks may be generated in the semipermeable membrane layer.

In the coating step S1, the technique for coating the support with the semipermeable membrane layer-forming composition is not particularly limited, and examples of the technique include a capillary technique, a gravure technique, a roll technique, a die (lip) technique, a slit technique, and a bar technique. In particular, in order to form a thin membrane, a capillary technique, a die technique, a slit technique, and a bar technique are preferable. Known coaters can be used for coating by any of the techniques.

The lower limit of the average wet thickness of the coating layer formed by coating with the semipermeable membrane layer-forming composition is preferably 1.0 μm and more preferably 3.0 μm. Meanwhile, the upper limit of the average wet thickness of the coating layer is preferably 40 μm and more preferably 35 μm. When the average wet thickness of the coating layer is less than the lower limit, it becomes difficult to evenly disperse the fluororesin powder, and pin holes and cracks may be generated in the resulting semipermeable membrane layer. Conversely, when the average wet thickness of the coating layer exceeds the upper limit, the average thickness of the semipermeable membrane layer becomes excessively large, and the produced laminated complex may have degraded molecule or ion separation performance.

Before coating with the semipermeable membrane layer-forming composition, the surface of the support may be modified by coating, a plasma treatment, or the like. As a result, the solvent can easily infiltrate into the support.

<Immersing Step>

In the immersing step S2, at least the coated surface of the support is immersed in water after the coating step S1. Specifically, for example, the support is immersed in a water vessel having a volume enough to accommodate the support. Water inside the water vessel may be standing water or flowing water.

In the immersing step S2, the support is immersed so that at least the portion coated with the semipermeable membrane layer-forming composition in the support is immersed in water. Moreover, the portion not coated with the semipermeable membrane layer-forming composition in the support is preferably not immersed in water. When the coated surface of the support is immersed in water but not the uncoated surface, the solvent can easily pass through the support and vaporize from the uncoated surface side in the heating step S3 while suppressing penetration of the semipermeable membrane layer-forming composition into the support. Therefore, the effect of suppressing generation of pin holes and cracks in the semipermeable membrane layer can be enhanced.

Moreover, in the immersing step S2, the support is preferably immersed in water before the surface of the coating layer formed by coating in the coating step S1 dries. When the support is immersed in water before the surface of the coating layer dries, the effect of suppressing penetration of the semipermeable membrane layer-forming composition into the support can be enhanced. Note that "before the surface dries" means before the mass of the solvent in the semipermeable membrane layer-forming composition is reduced to 20% or less of the mass of the solvent at the time of coating in a region that spans from the surface of the coating layer to a depth equal to 10% of the average thickness of the coating layer.

<Heating Step>

In the heating step S3, water in which the support is immersed is heated. Specifically, while the support is immersed so that the surface thereof coated with the semipermeable membrane layer-forming composition is immersed in water, water is heated to vaporize and remove the solvent contained in the semipermeable membrane layer-forming composition. As a result, a semipermeable membrane layer is formed on the outer surface of the support.

The heating device used for heating water is not particularly limited. For example, an infrared lamp, an induction heating coil, or the like can be used. The heating device may be installed in water to directly heat water or may be installed outside the water vessel storing water so that water is indirectly heated by radiation or the like.

In heating described above, heating is preferably performed at a first temperature, and then further at a second temperature higher than the first temperature. When heating is performed in two stages as such, first, heating at the first temperature decreases the temperature gradient between water and the support, and then the solvent contained in the semipermeable membrane layer-forming composition can be vaporized by heating at the second temperature. Thus, the difference in temperature between the support and the semipermeable membrane layer during vaporization of the solvent can be narrowed, and thus, the effect of suppressing generation of pin holes and cracks in the semipermeable membrane layer can be enhanced.

The lower limit of the first temperature is preferably 40° C. and more preferably 45° C. Meanwhile, the upper limit of the first temperature is preferably 60° C. and more preferably 55° C. When the first temperature is lower than the lower limit, the difference in temperature between the semipermeable membrane layer and the support widens during heating at the second temperature, and thus, the effect of suppressing generation of pin holes and cracks in the semipermeable membrane layer may become insufficient. Conversely, when the first temperature exceeds the upper limit, the amount of solvent vaporizing from the semipermeable membrane layer-forming composition increases, and the effect of using the first temperature to decrease the temperature gradient may not be obtained.

The lower limit of the second temperature is preferably 70° C. and more preferably 75° C. Meanwhile, the upper limit of the second temperature is preferably 95° C. and more preferably 90° C. When the second temperature is lower than the lower limit, it takes the solvent in the semipermeable membrane layer-forming composition a longer time to vaporize, and thus the semipermeable membrane layer-forming composition may penetrate into the support. Conversely, when the second temperature exceeds the upper limit, a facility such as an autoclave becomes necessary, and the facility cost and operating cost may increase.

The heating time at the first temperature may be any as long as the temperature gradient between water and the support can be decreased, and can be, for example, 2 minutes or longer and 5 minutes or shorter. The heating time at the second temperature may be any as long as the solvent vaporizes sufficiently, and can be, for example, 2 minutes or longer and 5 minutes or shorter.

<Annealing Step>

In the annealing step S4, the laminated complex after the heating step S3 is annealed. Specifically, the laminated complex after the heating step S3 is taken out of water and heated for a particular time. When the method further includes the step of annealing the laminated complex after the heating step, the crystallinity of the fluororesin can be saturated, and thus the strength of the semipermeable membrane layer is improved, and the effect of suppressing generation of pin holes and cracks in the semipermeable membrane layer is enhanced.

The atmosphere in which the annealing step S4 is performed may be an air atmosphere or an inert gas atmosphere such as $N_2$ or Ar. In particular, a $N_2$ gas atmosphere is preferable since there is no risk of oxidation of the laminated complex and the cost is relatively low.

The lower limit of the heating temperature in the annealing step S4 is preferably 150° C. and more preferably 180° C. Meanwhile, the upper limit of the heating temperature in the annealing step S4 is preferably 250° C. and more preferably 230° C. When the heating temperature in the annealing step S4 is lower than the lower limit, the effect of improving the strength of the semipermeable membrane layer may not be sufficiently obtained. Conversely, when the heating temperature in the annealing step S4 exceeds the upper limit, the laminated complex may be damaged.

The lower limit of the heating time in the annealing step S4 is preferably 15 minutes and more preferably 20 minutes. The upper limit of the heating time in the annealing step S4 is preferably 60 minutes and more preferably 40 minutes. When the heating time in the annealing step S4 is shorter than the lower limit, the effect of improving the strength of the semipermeable membrane layer may not be sufficiently obtained. Conversely, when the heating time in the annealing step S4 is longer than the upper limit, the effect of improving the strength of the semipermeable membrane layer worthy of the increase in the manufacturing cost may not be obtained.

[Laminated Complex]

Figure 2:
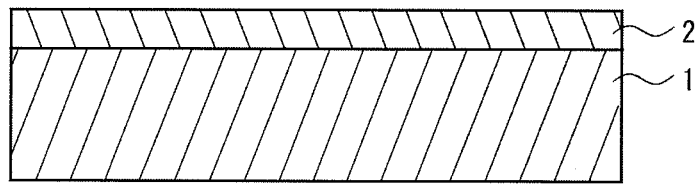
FIG. 2 is a schematic cross-sectional view indicating a laminated complex according to one embodiment of the present invention.

A laminated complex illustrated in FIG. 2 is a membrane-shaped laminated complex used in separation of molecules or ions. The laminated complex includes a sheet-shaped porous support 1 and a semipermeable membrane layer 2 stacked on one surface of the support 1. The laminated complex can be produced by, for example, the method for producing a laminated complex illustrated in FIG. 1.

In this laminated complex, the semipermeable membrane layer 2 is directly stacked on the support 1; thus, the support 1 and the semipermeable membrane layer 2 are integrated, the strength of the semipermeable membrane layer 2 is increased, and thus, handling during or after production is facilitated. As a result, generation of pin holes and cracks in the semipermeable membrane layer 2 can be suppressed even when the thickness of the semipermeable membrane layer 2 is reduced. Consequently, in this laminated complex, the semipermeable membrane layer 2 can have an average thickness of 10 μm or less and a pore size of less than 10 nm. Furthermore, since the support 1 in the laminated complex is porous, the diffusing rate of the substance passing therethrough is rarely obstructed. Thus, the laminated complex is suitable for separating molecules or ions.

<Support>

The support 1 is the same as the support described in the method for producing a laminated complex, and the description therefor is omitted.

<Semipermeable Membrane>

The semipermeable membrane layer 2 is a layer that separates molecules or ions. The main component of the semipermeable membrane layer 2 is not particularly limited as long as a layer that can separate molecules or ions can be formed. Examples of thereof include amorphous fluororesins, polytetrafluoroethylene (PTFE), and tetrafluoroethylene-perfluoroalkyl vinyl ether copolymer (PFA). Among these, amorphous fluororesins are preferable. When the main component of the semipermeable membrane layer 2 is an amorphous fluororesin, the coating property of the semipermeable membrane layer 2 for the support 1 is improved, and pin holes and cracks in the semipermeable membrane layer 2 can be reduced.

The lower limit of the average thickness of the semipermeable membrane layer 2 is preferably 0.5 μm and more preferably 1.0 μm. The upper limit of the average thickness of the semipermeable membrane layer 2 is preferably 10 μm, more preferably 7 μm, and yet more preferably 5 μm. When the average thickness of the semipermeable membrane layer 2 is less than the lower limit, it becomes difficult to form a homogeneous semipermeable membrane layer 2, and pin holes and cracks may be generated in the semipermeable membrane layer 2. Conversely, when the average thickness of the semipermeable membrane layer 2 exceeds the upper limit, the laminated complex may have degraded molecule or ion separation performance. Note that the average thickness of the semipermeable membrane layer 2 can be calculated from a scanning electron microscope (SEM) image taken at a section of the laminated complex, for example.

The upper limit of the average penetration distance of the semipermeable membrane layer 2 from the outer surface of the support 1 is 5 µm and more preferably 2 µm. When the average penetration distance exceeds the upper limit and the thickness of the semipermeable membrane layer 2 is reduced, the proportion of the semipermeable membrane layer 2 that lies outside the support 1 relative to the entire semipermeable membrane layer 2 becomes relatively small. Thus, the semipermeable membrane layer 2 is likely to have pin holes and cracks, and it may become difficult to use the laminated complex to separate molecules or ions. Meanwhile, the lower limit of the average penetration distance is preferably as small as possible, and the semipermeable membrane layer 2 preferably does not substantially penetrate the support 1. Here, "does not substantially penetrate" means that the average penetration distance is 0.01 µm or less and preferably 0.001 µm or less.

The semipermeable membrane layer 2 has pores for separating molecules or ions. The average pore size of the semipermeable membrane layer 2 is determined according to the diameters of the molecules or ions to be separated. The upper limit of the average pore size of the semipermeable membrane layer 2 is preferably 9 nm, more preferably 8 nm, and yet more preferably 7 nm. When the average pore size of the semipermeable membrane layer 2 exceeds the upper limit, the desired molecules or ions may not be separated. The lower limit of the average pore size of the semipermeable membrane layer 2 is not particularly limited and is, for example, 0.1 nm.

The maximum pore size of the semipermeable membrane layer 2 is preferably less than 10 nm. When the maximum pore size of the semipermeable membrane layer 2 is equal to or more than the upper limit, leakage contamination may occur during separation of molecules or ions.

The lower limit of the density of the semipermeable membrane layer 2 is preferably 1.3 g/cm$^3$ and more preferably 1.5 g/cm$^3$. The upper limit of the density of the semipermeable membrane layer 2 is preferably 2.2 g/cm$^3$ and more preferably 2.1 g/cm$^3$. When the density of the semipermeable membrane layer 2 is less than the lower limit, the strength of the semipermeable membrane layer 2 may become insufficient. Conversely, when the density of the semipermeable membrane layer 2 exceeds the upper limit, the laminated complex may have degraded molecule or ion separation performance.

The lower limit of the ratio of the average pore size of the semipermeable membrane layer 2 to the average pore size of the support 1 is preferably 1/30000, more preferably 1/3000, and yet more preferably 1/1000. The upper limit of the ratio of the average pore size of the semipermeable membrane layer 2 is preferably 1/50 and more preferably 1/100. When the ratio of the average pore size of the semipermeable membrane layer 2 is less than the lower limit, the average pore size of the support 1 becomes relatively excessively large, and thus, the separation ability improving effect that is worthy of the degradation of the strength of the laminated complex may not be obtained. Conversely, when the ratio of the average pore size of the semipermeable membrane layer 2 exceeds the upper limit, the average pore size of the support 1 becomes relatively excessively small, and thus, the diffusing rate of the substance passing therethrough is degraded, and the performance of the laminated complex as a separation membrane may become insufficient.

The lower limit of the average thickness of the laminated complex is preferably 50 µm and more preferably 100 µm. The upper limit of the average thickness of the laminated complex is preferably 1000 µm and more preferably 500 µm. When the average thickness of the laminated complex is less than the lower limit, the strength of the laminated complex becomes insufficient, and pin holes and cracks may be generated in the semipermeable membrane layer 2. Conversely, when the average thickness of the laminated complex exceeds the upper limit, the laminated complex becomes thick beyond what is necessary, and the handling property of the laminated complex may be degraded.

The lower limit of the Gurley number of the laminated complex is preferably 600 seconds, more preferably 1000 seconds, and yet more preferably 5000 seconds. Meanwhile, the upper limit of the Gurley number is not particularly limited, and is preferably as large as possible. When the Gurley number is equal to or larger than the lower limit, generation of pin holes and cracks can be further reduced.

The laminated complex can selectively allow molecules having a kinetic diameter of less than 0.40 nm to permeate. Specifically, the laminated complex can selectively allow helium, hydrogen, carbon dioxide, oxygen, nitrogen, or methane, either in liquid form or a gas form, to permeate.

More specifically, the laminated complex has an oxygen enrichment function through selective permeation of oxygen. Thus, the laminated complex can function as an oxygen generator and can be applied to usages such as oxygen inhalation healing (oxygen capsules, air conditioners, etc.) for respiratory ailment, combustion efficiency enhancement for combustion engines, barrier membranes for NOx-reducing oxygen sensors (protection of sensors from an acidic substance, $H_2S$, etc., larger than oxygen).

Moreover, since the laminated complex has a carbon dioxide enrichment function through selective permeation of carbon dioxide, the laminated complex can be used as a carbon dioxide generator and can be applied to usages such as green houses, and culture of seaweed, waterweed, etc. Moreover, since the laminated complex has a nitrogen enrichment function through selective permeation of nitrogen, the laminated complex can be applied to nitrogen generators for analysis, inert gas purging employed in various processes, etc.

Furthermore, the laminated complex can also be applied to a methane concentrating device with which carbon dioxide and methane are separated from natural gas or bio gas, a hydrogen extracting device with which hydrogen is extracted from a mixed gas containing hydrogen and carbon dioxide generated from natural gas modification, coal gasification, or the like, and a carbon dioxide extracting device with which carbon dioxide is extracted from effluent gas containing carbon dioxide and nitrogen emitted from a thermal power plant or the like. This carbon dioxide extraction contributes to the fight against global warming and to production of dry ice.

Other Embodiments

The embodiments disclosed herein are only exemplary in all respects and should not be considered as limiting. The scope of the present invention is not limited by the features of the embodiments described above and is intended to include all modifications and alterations within the meaning and the range defined by the claims and their equivalents.

In the embodiment of the laminated complex, the case in which a semipermeable membrane layer is stacked on one surface of a support is described. Alternatively, the semipermeable membrane layer may be stacked on both surfaces of the support. The method for producing a laminated complex in which the semipermeable membrane layer is stacked on both surfaces of the support involves coating both surfaces of the support with the semipermeable membrane layer-forming composition in the coating step, and then immersing the support in water so that both surfaces are in water. Furthermore, in the heating step, the solvent is removed by causing the solvent to pass through the interior of the support and vaporize from the uncoated surfaces, such as side surfaces, of the support. Alternatively, the coating step and the heating step may be performed for each of the surfaces so as to form the semipermeable membrane layers on both surfaces.

Figure 3:
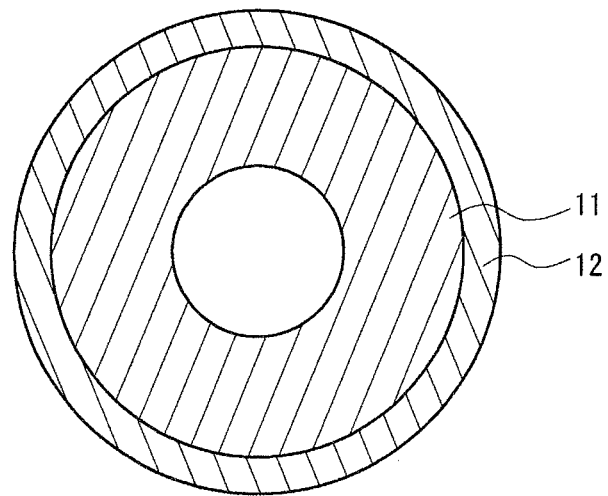
FIG. 3 is a schematic cross-sectional view indicating a laminated complex according to an embodiment different from the one illustrated in FIG. 2.

The embodiment of the laminated complex includes a laminated complex in which the support has a tube shape as illustrated in FIG. 3. In this case, a semipermeable membrane layer 12 is stacked on an outer peripheral surface of a support 11.

In the method for producing a laminated complex, annealing is not an essential constitutional feature and can be omitted.

The laminated complex is suitable for use as a gas separation membrane, or a separation membrane such as a reverse osmosis membrane (RO membrane).

EXAMPLES

The present invention will now be described more specifically through examples, which do not limit the present invention.

(No. 1)

A flat membrane-shaped PTFE porous sheet ("POREFLON FP-045-80" produced by Sumitomo Electric Fine Polymer Inc.) was prepared as a support. Moreover, as the semipermeable membrane-forming composition, a semipermeable membrane layer-forming composition was prepared by dispersing an amorphous fluororesin ("AD60" produced by Solvay Solexis Inc.) in a solvent, i.e., perfluoropolyether (Galden (registered trademark) "HT110" produced by Solvay Solexis Inc., boiling point: 110° C., surface tension: 16 dyne/cm). The amorphous fluororesin content in the semipermeable membrane layer-forming composition was 9 mass %.

Next, one surface of the support was coated with the semipermeable membrane layer-forming composition so that the average wet thickness was 30 μm.

Before the coated surface was dry, the support was immersed in water so that the coated surface was in water.

Water in which the support was immersed was heated, and heating at 50° C. for 3 minutes and heating at 80° C. for 3 minutes were performed in this order to as to vaporize and remove the solvent.

Lastly, the support was taken out of water and annealed in air at 200° C. for 30 minutes to prepare laminated complex No. 1.

(No. 2)

Laminated complex No. 2 was prepared as with laminated complex No. 1 except that the support was a hollow fiber-shaped PTFE porous tube ("POREFLON TB1009" produced by Sumitomo Electric Fine Polymer Inc.) and the outer surface of this tube was coated with the semipermeable membrane-forming composition.

(No. 3)

Laminated complex No. 3 was prepared as with laminated complex No. 1 except that after coating with the semipermeable membrane-forming composition, the support was not immersed in water and the solvent was vaporized and removed in air.

(No. 4)

Laminated complex No. 4 was prepared as with laminated complex No. 2 except that after coating with the semipermeable membrane-forming composition, the support was not immersed in water and the solvent was vaporized and removed in air.

[Evaluation]

The following evaluations were conducted for laminated complexes No. 1 to No. 4.

<Appearance Observation>

The appearance was visually observed. A glossy semipermeable membrane layer was formed in all of laminated complexes No. 1 to No. 4.

<Sectional Observation>

A section of the laminated complex was observed with a SEM, and the thickness of the semipermeable membrane layer in the laminated complex was measured. Moreover, whether there were pores having a diameter of 10 nm or more was checked on the basis of the evaluation standard below. These results are indicated in Table 1. Note that the average penetration distance of the semipermeable membrane layer from the outer surface of the support was 0 μm for No. 1 and No. 2.

A: No pores having a diameter of 10 nm or more were found.

B: Pores having a diameter of 10 nm or more were found.

<Defect Inspection>

For the sheet-shaped laminated complexes of No. 1 and No. 3, hexane was added dropwise and the permeability was checked according to the standard below. Note that hexane passes through when pin holes are present. The results are indicated in Table 1.

A: Hexane did not pass through and was repelled.

B: Hexane passed through.

For the tube-shaped laminated complexes of No. 2 and No. 4, the laminated complex was immersed in water, and an air internal pressure loading test was performed to check whether or not air leaked. The air internal pressure loading test was performed by applying a pressure of 100 kPa onto the inner surface side of the tube-shaped laminated complex by using air. The results are indicated in Table 1.

A: No air leakage.

B: Air leakage occurred.

<Gurley Number>

The time required for 100 cm³ of air to pass through a 6.45 cm² laminated complex at an average pressure difference of 1.22 kPa was measured in accordance with JIS-P 8117 (2009). The results are indicated in Table 1. Note that in No. 1 and No. 2, air did not pass through the laminated complex within the measured time.

TABLE 1

| | SEM observation | | Defect | |
| | Average thickness | Section | inspection | Gurley number |
|---|---|---|---|---|
| No. 1 | 3.5 μm | A | A | ∞ |
| No. 2 | 3.5 μm | A | A | ∞ |

TABLE 1-continued

|  | SEM observation | | Defect | |
| --- | --- | --- | --- | --- |
|  | Average thickness | Section | inspection | Gurley number |
| No. 3 | 3.5 μm | B | B | 500 seconds |
| No. 4 | 3.5 μm | B | B | 220 seconds |

The results of Table 1 show that a semipermeable membrane layer having an average thickness of 3.5 μm was formed in all of laminated complexes No. 1 to No. 4, but hexane and air leakage was not observed in laminated complexes No. 1 and No. 2 compared to laminated complexes No. 3 and No. 4, which indicates that pin holes and cracks are few. In contrast, with laminated complexes No. 3 and No. 4, presumably because the solvent was vaporized and removed in air, the composition for forming the semipermeable membrane layer penetrated the support, thereby generating pin holes and cracks, and thus, hexane and air leakage was observed.

The results above show that even when the average thickness of the semipermeable membrane layer is 10 μm or less, a laminated complex in which cracks and pin holes with a diameter of 10 nm or more are rarely generated can be produced by immersing the support in water after the coating step and vaporizing and removing the solvent by heating water in which the support is immersed.

(No. 5)

Laminated complex No. 5 including a semipermeable membrane with an average thickness of 2.6 μm was obtained by the same procedure as in No. 1 and by adjusting the coating thickness of the semipermeable membrane layer-forming composition.

Several types of mixed gases were supplied to laminated complex No. 5 to investigate the selective permeability for each gas. Table 2 indicates the permeation flow rate and the permeability for each gas. Moreover, the separation coefficients (permeability ratios) for combinations of gases are indicated in Table 3. Table 4 indicates the volume ratio of each component before separation of mixed gases (A to D) when mixed gases were supplied to three laminated complexes (3 passes) and the volume ratio of each component after each pass. The difference in pressure between the pressurizing side and the depressurizing side of the laminated complex was 74.9 cmHg, and the permeation area of the laminated complex was 15.2 cm$^2$.

In Table 4, the mixed gas A simulates air, and was supplied to the laminated complex to enrich oxygen and enrich carbon dioxide. The mixed gas B simulates modified natural gas, and was supplied to the laminated complex to produce hydrogen. The mixed gas C simulates a bio gas, and was supplied to the laminated complex to concentrate methane. The mixed gas D simulates an effluent gas from a power plant, and was supplied to the laminated complex to separate, capture, and store carbon dioxide (CCS).

TABLE 2

| | Kinetic diameter nm | Permeation flow rate cc/m$^2$/min | Permeability cc/cm$^2$/sec/cmHg |
| --- | --- | --- | --- |
| He | 0.260 | 9034 | 2.01E−04 |
| H$_2$ | 0.289 | 4828 | 1.07E−04 |
| CO$_2$ | 0.330 | 2138 | 4.75E−05 |
| O$_2$ | 0.346 | 1172 | 2.61E−05 |
| N$_2$ | 0.364 | 759 | 1.69E−05 |
| CH$_4$ | 0.380 | 690 | 1.53E−05 |

TABLE 3

| | | Separation coefficient (Y/X) | | | | |
| --- | --- | --- | --- | --- | --- | --- |
| Y | He | 1.87 | 4.23 | 7.71 | 11.9 | 13.1 |
| | H$_2$ | | 2.26 | 4.12 | 6.36 | 7.00 |
| | CO$_2$ | | | 1.82 | 2.2 | 3.10 |
| | O$_2$ | | | | 1.55 | 1.70 |
| | N$_2$ | | | | | 1.10 |
| | CH$_4$ | | | | | |
| | | He | H$_2$ | CO$_2$ | O$_2$ | N$_2$ | CH$_4$ |
| | | | | X | | | |

TABLE 4

| | A | | | B | | C | | D | |
| --- | --- | --- | --- | --- | --- | --- | --- | --- | --- |
| | CO$_2$ | O$_2$ | N$_2$ | H$_2$ | CO$_2$ | CO$_2$ | CH$_4$ | CO$_2$ | N$_2$ |
| Before separation | 0.04 | 21 | 78 | 80 | 20 | 40 | 60 | 13 | 87 |
| After one pass | 0.1 | 29.4 | 70.5 | 90.0 | 10.0 | 67.4 | 32.6 | 29.6 | 70.4 |
| After two passes | 0.2 | 39.0 | 60.7 | 95.3 | 4.7 | 86.5 | 13.5 | 54.3 | 45.7 |
| After three passes | 0.6 | 49.6 | 49.9 | 97.9 | 2.1 | 95.2 | 4.8 | 77.0 | 23.0 |

According to Tables 2 to 4, laminated complex No. 5 can selectively allow helium, hydrogen, carbon dioxide, oxygen, nitrogen, and methane, whose molecules have a kinetic diameter of less than 0.40 nm, to permeate. Moreover, laminated complex No. 5 has functions of oxygen enrichment, carbon dioxide enrichment, hydrogen production, methane concentration, carbon dioxide separation, etc.

REFERENCE SIGNS LIST 1, 11 support
2, 12 semipermeable membrane layer

The invention claimed is:

1. A method for producing a laminated complex that includes a sheet-shaped or tube-shaped porous support and a semipermeable membrane layer stacked on an outer surface of the support, the method comprising:
    a coating step of coating the outer surface of the support with a semipermeable membrane layer-forming composition in which a fluororesin is dispersed in a solvent;
    an immersing step of immersing the coated surface of the support in water after the coating step; and
    a heating step of heating water in which the support is immersed.

2. The method for producing a laminated complex according to claim 1, further comprising an annealing step of annealing the laminated complex after the heating step.

3. The method for producing a laminated complex according to claim 1, wherein the solvent has a boiling point of 50° C. or higher and 150° C. or lower.

4. The method for producing a laminated complex according to claim 1, wherein the support has a porosity of 30% or more and 90% or less.

* * * * *